March 25, 1969     YOICHI MATSUMURA ET AL     3,434,712

APPARATUS FOR DETERMINING TIME AND ORDER OF ARRIVAL

Filed Oct. 7, 1964

Inventors
Yochi Matsumura
Mitsuo Ogawa
Mitsuhiro Toda
By Stevens, Davis, Miller & Mosher
ATTORNEYS Inventors
Yoichi Matsumura
Mitsuo Ogawa
Mitsuhiro Toda By Stevens, Davis, Miller & Mosher
ATTORNEYS United States Patent Office 3,434,712
Patented Mar. 25, 1969

3,434,712
APPARATUS FOR DETERMINING TIME AND ORDER OF ARRIVAL
Yoichi Matsumura, Kawasaki-shi, Mitsuo Ogawa, and Mitsuhiro Toda, Yokohama, Japan, assignors to Matsushita Electric Industrial Co., Ltd., Osaka, Japan, a corporation of Japan
Filed Oct. 7, 1964, Ser. No. 402,191
Claims priority, application Japan, Oct. 9, 1963, 38/52,651
Int. Cl. A63k 3/00
U.S. Cl. 272—4     3 Claims

ABSTRACT OF THE DISCLOSURE

A device for automatically determining with a high precision the times of arrival and the lap times, at measured intervals, for each of a plurality of contestants swimming or running an assigned separate prescribed course, and for automatically judging the order of finish of each contestant, and further for indicating and recording the results.

---

The present invention relates to an apparatus for determining the time and order of arrival of contestants in swimming meets and other contests, such as running.

The primary object of our invention is to provide an apparatus for automatically measuring lap times and times of arrivals with a high precision, and for judging the order of arrival of contestants automatically, in swimming meets and the like, as well as for giving visible indications of the results of the determination without the use of manually operated means, such as stop watches.

Another object of the present invention is to provide an apparatus of the kind above-specified, in which printed records of the results are also obtained.

A further object of the present invention is to provide an apparatus for automatically determining times and order of arrival of contestants in races other than swimming meets which requires lap-time determination.

There are other objects and particularities of the invention which will be made obvious from the following description with reference to the accompanying drawings showing a preferred embodiment of the invention, in which.

Figure 1:
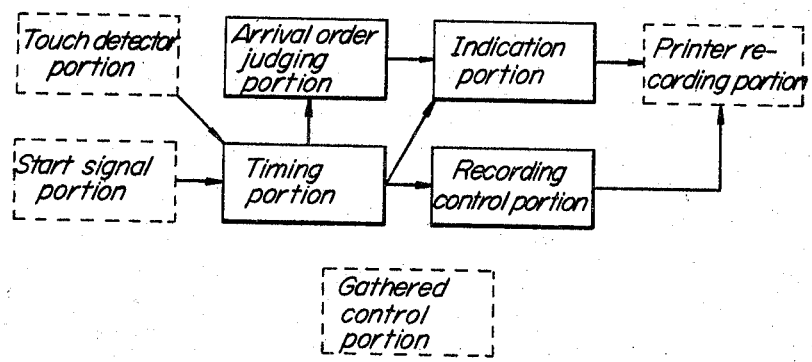
FIG. 1 is a block diagram showing the general construction of the device.

Referring to the accompanying drawings, particularly to FIG. 1, the apparatus comprises a timing portion, an arrival order judging portion, an indicating portion, and a recording control portion. In assocation with the above, a start signal portion, a touch detector portion, a printer recording portion for printing characters, and a main control portion, are also provided.

Timing portion

Figure 2:
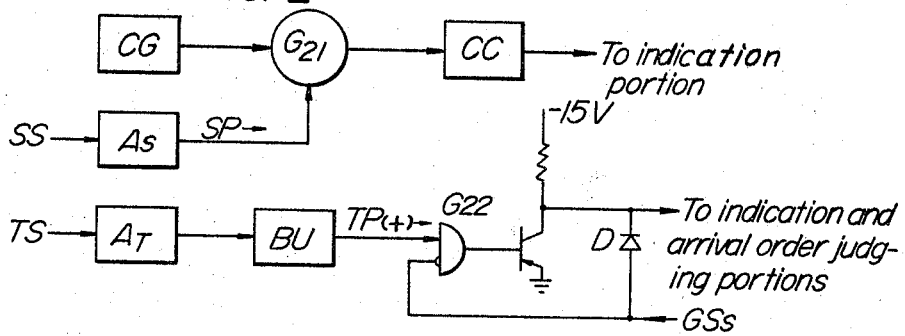
FIG. 2 shows a block level schematic of the timing portion.

Referring to FIG. 2, the timing portion comprises a clock pulse generator CG which produces clock pulses of one hundredth of a second divided from a highly precise frequency of 100 kc., a gate $G_{21}$, and a clock counter CC which receives clock pulses from the clock generator CG for measuring the time that has elapsed from the starting time. A start signal SS is amplified and shaped in means $A_S$ to form start pulse SP which is delivered to open the gate $G_{21}$.

Figure 3:
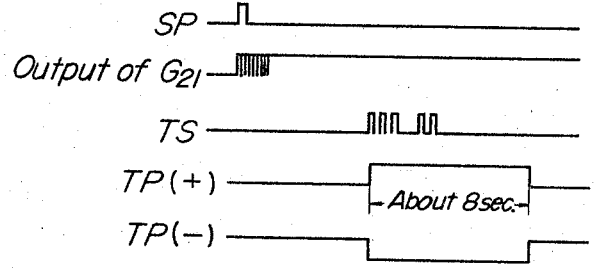
FIG. 3 shows various signals in said timing portion.

The timing portion further comprises an amplifying and shaping means $A_T$, by which touch signals TS from a touch detector are amplified and shaped. Thereafter the signals are applied to a buffer BU which converts a series of signals generated by the touching of each touch detector. The buffer BU consists of a monostable multivibrator and produces a touch pulse TP of about 8-seconds duration, which is sent to the arrival order judging portion and the indication portion through a gate $G_{22}$. The above-mentioned various signals are as shown in FIG. 3. After goal-in, a goal-in signal $GSs$ closes the gate $G_{22}$, and therefore the touch pulse is stopped from passing to the next stage.

Arrival order judging portion

Figure 4:
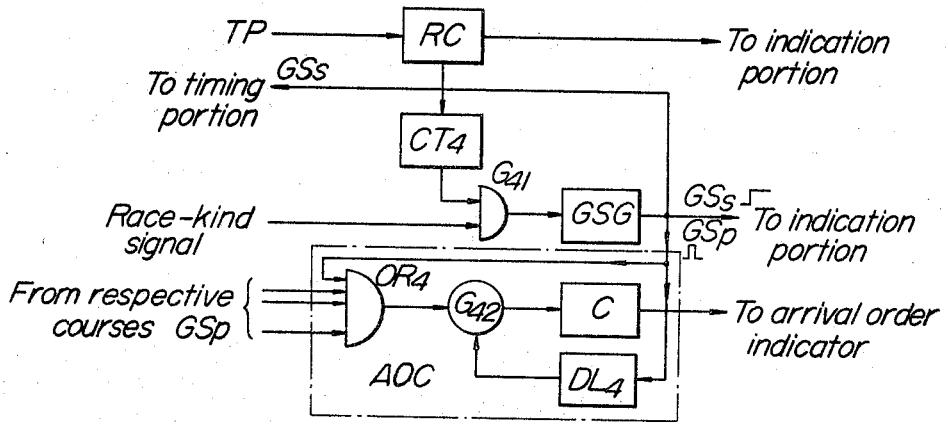
FIG. 4 shows a block level schematic of the arrival order judging portion.

This portion judges the order of arrival of racers, and also counts the number of laps. Referring to FIG. 4, the arrival judging portion comprises a reversible counter RC which is triggered by the touch pulse TP from the timing portion for counting the number of laps. The result of counting is partly sent to the indicating portion. For correcting mis-touching, the counter is able to effect reverse operation.

The goal-in signal GS is produced in the manner of the following description.

According to the kind of race, that is, distance of the race, such as 100M, 200M, 400M, 800M, 1500M, etc., the number of laps is determined for the particular race course, and the number of the final lap is preset, so that the goal-in may be detected. For a 400M swimming match, for example, with the fourth touch signifying the goal-in, the reversible counter RC is preset to deliver a signal to a code counter $CT_4$ when it has counted four. The output of the counter $CT_4$ is compared with a "race-kind signal," and when these two signals coincide, a gate $G_{41}$ is opened to operate a goal-in signal generator GSG. The goal-in signal GS produced by the generator GSG consists of a positive step $GSs$ and a pulse of narrow width $GSp$, the former being sent to gate $G_{22}$ of the timing portion (FIG. 2), while the latter is sent to an arrival order counter AOC. Therefore the touch pulse, which comes in thereafter, is not sent to the next stage. The positive step $GSs$ is also sent to the indicating portion.

The arrival order counter AOC receives goal-in signals $GSp$ transmitted from the respective race courses at an or gate $OR_4$ and counts same at a counter C, before which a gate $G_{42}$ is arranged. This gate is closed by a signal from a delay circuit $DL_4$ which delays the goal-in signal of the corresponding course. Consequently, the counter C operates to count only the goal-in signal of that course and prior goal-in signals of other courses. As a result, the counter C gives the arrival order of that course.

Indication portion

Figure 5:
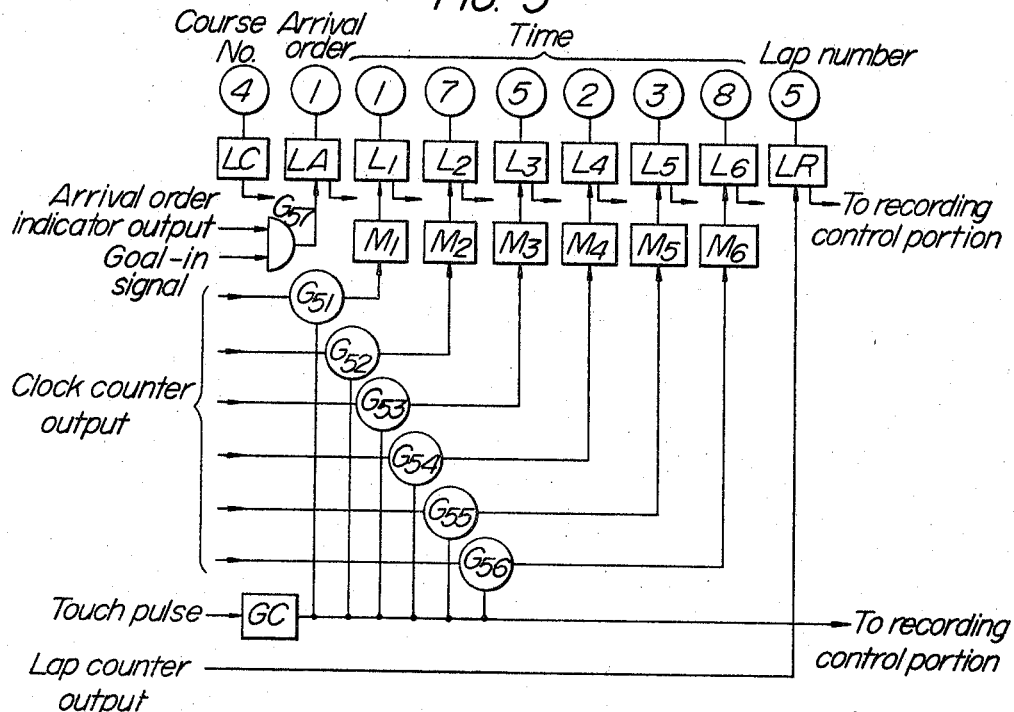
FIG. 5 shows a block level schematic of the indicating portion.

Referring to FIG. 5, the indication portion comprises an indicator LC for indicating course number, an indicator LA for indicating arrival order or number, indicators $L_1$ to $L_6$ for showing times required, and an indicator LR for showing the number of laps.

The course number indicator LC shows the number allotted to the particular course, and the arrival order indicator LA and the lap number indicator LR indicate the outputs of arrival number counter C (FIG. 4) and the reversible counter RC (FIG. 4), respectively. The arrival order indicator LA gives an indication after the arrival order has been determined when a gate $G_{57}$ is opened by coincidence of the output of arrival number counter C with the goal-in signal $GSs$. The output of the clock counter CC (FIG. 2) is transmitter to indicators $L_1$ to $L_6$ through gates $G_{51}$ to $G_{56}$ and memory devices $M_1$ to $M_6$, respectively. When a touch pulse arrives at a gate controller GC, the controller operates to close respective gates for about 8 seconds, and the time of touch is indicated for about eight seconds. After said 8 seconds, respective gates are opened to re-start the clock-counter indication. When the racer has goaled in, the goal-in step signal GSs is applied to the touch-pulse output line through a diode D (FIG. 2), so that the respective gates remain closed, and the times required remain indicated.

The input to the indicating portion is simultaneously transmitted to the recording control portion also.

*Recording control portion*

Figure 6:
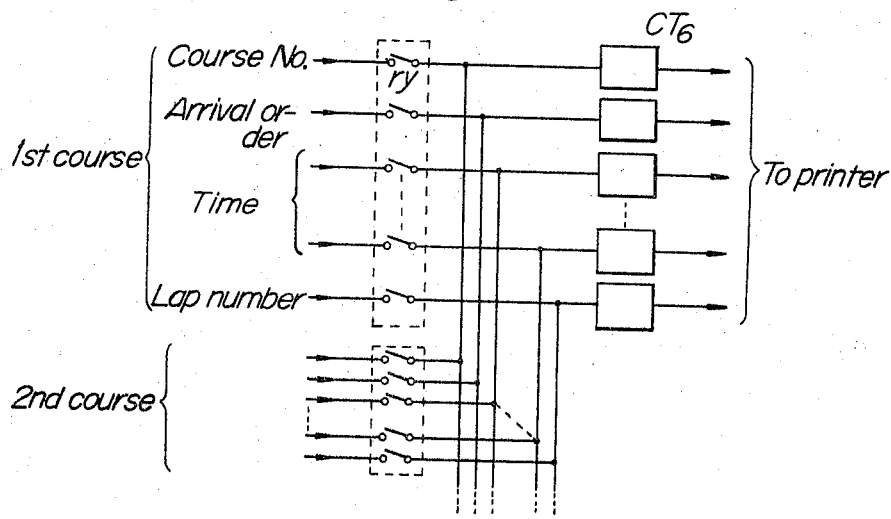
FIGS. 6 and 7 show block level schematics of the control portion.
Figure 7:
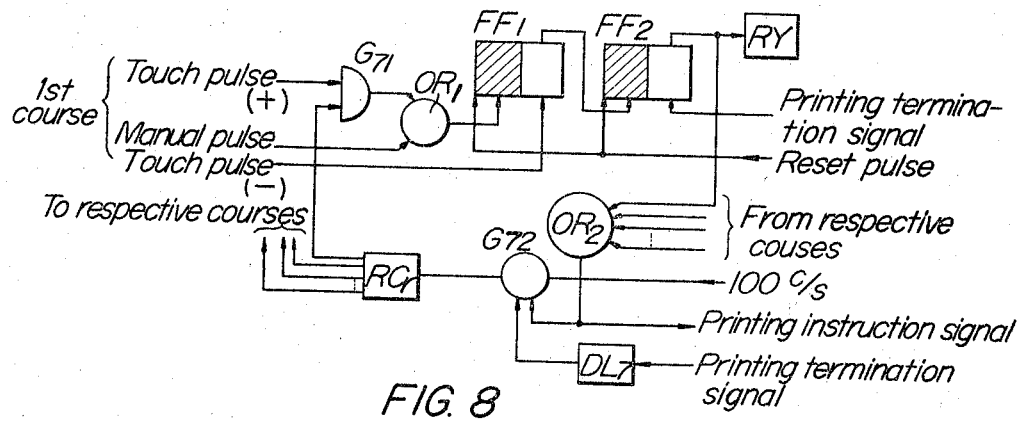

Referring to FIGS. 6 and 7, the recording control portion comprises normally closed relay contacts RY, one side thereof being connected to respective output lines from the indicating portion of respective courses, through which lines the record outputs are transmitted in the form of binary codes. The other sides of the relay contacts RY for respective courses are connected together for respective signals or pulses, and connected to a code converter $CT_6$, wherein the binary code is converted into a decimal code and transmitted to the printer, (not shown). The reason why the indicating portion output is in the form of a binary code is to minimize the number of relay contacts.

On each touch, the lap time is indicated, and a relay RY (FIG. 7) particular to the corresponding course only should be operated to transmit the time signal to the printer. It is required that, if two or more courses are touched during the printing operation, only one relay operates, and after the completion of recording for the first course, the other relay operates.

Figure 8:
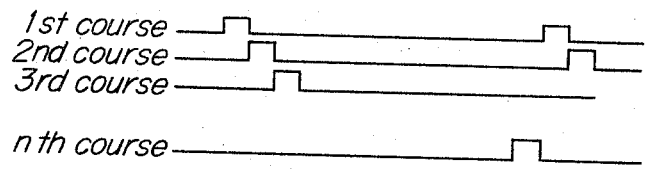
FIG. 8 shows the output of a ring counter $RCr$.

For this purpose, mutually displaced pulses are produced for respective courses as shown in FIG. 8, and only when such a pulse coincides with the touch pulse transmitted from the indication portion upon each touching, relay RY of the corresponding course only is operated.

FIG. 7 shows a preferred construction for accomplishing the above result. The signal of 100 cycles per second is applied to a ring counter RCr through a gate $G_{72}$ to produce pulses as shown in FIG. 8, and these pulses are sent to the and gate $G_{71}$ for respective courses. The and gate $G_{71}$ is opened when the corresponding one of the above-identified pulses coincides with the touch pulse from the corresponding course and the output pulse is transmitted to a corresponding relay RY through an or gate OR, and flip-flops $FF_1$ and $FF_2$, to operate the relay. At the same time, the same output is transmitted to the printer through an or gate $OR_2$ as a printing order and also to close the 100 c./s. gate $G_{72}$. Consequently, even if touches have taken place in other courses, the printing order is not transmitted thereby to the printer. Upon completion of a printing operation, the gate $G_{72}$ is opened by a printing termination signal from the printer. However, a delay circuit $DL_7$ delays the signal in order that the next relay RY does not operate until the preceding relay has fully returned.

With regard to flip-flops $FF_1$ and $FF_2$, the first flip-flop $FF_1$ is provided in considering that the coincident output of the and gate $G_{71}$ would not completely trigger, and means are additionally provided for manual triggering. This is conveniently operated when it is desired to have the printing effected for each course or each order of arrival. The flip-flop $FF_1$ is returned to normal by a negative touch pulse signal after about 8 seconds. The second flip-flop $FF_2$ is returned to normal by a printing termination signal from the printer.

What is claimed is:

1. An apparatus for determining the elapsed time and order of arrival of each of a plurality of contestants in a race, comprising electrical circuit means including means to generate a start signal, logic gate means adapted to be opened by said start signal, a clock pulse generator passing a continuous sequence of clock pulses to said gate means, clock counter means for counting number of clock pulses passing through said gate, touch counting means for counting the number of touches of each contestant, each touch indicating the completion by a contestant of one lap in the race, means responsive to said touch counting means for generating a goal-in signal after a predetermined number of touches by a contestant have been counted, judging means for noting the order of occurrence of the goal-in signal of each contestant in the race, means for indicating the order of finish of said contestants according to the arrival of said goal-in signals, means for storing the output of said clock counter means, further gate means for each contestant for stopping the input to said storage means for a short interval of time after each touch and for maintaining the stopped condition upon receipt of a goal-in signal, and means for indicating the order of arrival and total elapsed time of each contestant.

2. An apparatus for determining the elapsed time and order of arrival of each of a plurality of contestants in a race, comprising means to generate a start signal, means to generate a continuous series of clock pulses, logic gate means opened by said start signal to pass said clock pulses therethrough, clock counter means adapted to count the clock pulses passing through said logic gates, means to count the number of touches of each contestant in the race, each touch indicating the completion by a contestant of one lap of the race, means to produce a goal-in signal when a predetermined number of said touches for a given contestant is attained, said touch counting means and goal-in signal producing means being provided in a number equal to the number of the contestants in the race, judging means to note the order of occurrence of said goal-in signals of said contestants, indicator means to display the order of arrival of the goal-in signals following the arrival of said goal-in signal of each contestant at said judging means, memory means to store the output of said clock counter means, further gate means for each contestant controlled by said indicator means to close for a short period of time thereby preventing a further input of said clock pulses to said memory means at the moment of said touches, said closed state of said further gate means being maintained after each occurrence of said goal-in signal, and means to indicate the order of occurrence of said goal-in signals of said contestants and each contestant's elapsed racing time.

3. An apparatus according to claim 2 further comprising means for printing out the results appearing at said indicator means.

References Cited

UNITED STATES PATENTS

| | | | |
|---|---|---|---|
| 621,314 | 3/1899 | Barber | 119—15.5 |
| 2,229,324 | 1/1941 | Gordon. | |
| 2,296,508 | 9/1942 | Eckert. | |
| 2,351,707 | 6/1944 | Rouprich. | |
| 3,263,168 | 7/1966 | Rainer. | |

FOREIGN PATENTS 907,252 10/1962 Great Britain.

ANTON O. OECHSLE, *Primary Examiner.*

ARNOLD W. KRAMER, *Assistant Examiner.*

U.S. Cl. X.R.

272—59; 324—70; 340—323